United States Patent [19]

Hemler, Jr. et al.

[11] 4,198,287
[45] * Apr. 15, 1980

[54] METHOD OF REGENERATING COKE-CONTAMINATED CATALYST WITH SIMULTANEOUS COMBUSTION OF CARBON MONOXIDE

[75] Inventors: Charles L. Hemler, Jr., Mt. Prospect; Laurence O. Stine, Western Springs, both of Ill.

[73] Assignee: UOP Inc., Des Plaines, Ill.

[*] Notice: The portion of the term of this patent subsequent to Aug. 22, 1995, has been disclaimed.

[21] Appl. No.: 878,963

[22] Filed: Feb. 17, 1978

Related U.S. Application Data

[63] Continuation-in-part of Ser. No. 654,260, Feb. 2, 1976, abandoned.

[51] Int. Cl.² .................. C10G 11/04; B01J 8/24; C01B 29/12
[52] U.S. Cl. .................. 208/113; 208/120; 208/121; 252/416
[58] Field of Search .................. 208/113–121, 208/164, DIG. 1; 252/455 R, 455 Z, 416–419

[56] References Cited

U.S. PATENT DOCUMENTS

| 3,696,025 | 10/1972 | Chessmore et al. | 208/113 |
| 3,909,392 | 9/1975 | Horecky et al. | 208/120 |
| 4,064,037 | 12/1977 | Graven | 208/120 |
| 4,071,436 | 1/1978 | Blanton et al. | 208/120 |
| 4,072,600 | 2/1978 | Schwartz | 208/120 |
| 4,088,568 | 5/1978 | Schwartz | 208/120 |
| 4,093,535 | 5/1978 | Schwartz | 208/121 |
| 4,108,795 | 8/1978 | Hemler et al. | 208/120 X |
| 4,115,249 | 9/1978 | Blanton et al. | 208/120 |
| 4,115,250 | 9/1978 | Flanders et al. | 208/120 |
| 4,115,251 | 9/1978 | Flanders et al. | 208/120 |

FOREIGN PATENT DOCUMENTS

| 2507343 | 9/1975 | Fed. Rep. of Germany | 208/120 |
| 1499682 | 2/1978 | United Kingdom | 208/120 |

Primary Examiner—Delbert E. Gantz
Assistant Examiner—G. E. Schmitkons
Attorney, Agent, or Firm—James R. Hoatson, Jr.; Louis A. Morris; William H. Page, II

[57] ABSTRACT

A method for regenerating a coke-contaminated cracking catalyst with the simultaneous carefully controlled combustion of CO to $CO_2$ within a regeneration zone to produce regenerated catalyst and flue gas. Novel features of the method include adding to the regeneration zone, independently of the cracking catalyst, a CO oxidation promoter and combusting CO to $CO_2$ in the presence of the promoter and regenerated catalyst. The oxidation promoter may be added to the regeneration zone in amounts to control the CO concentration in the flue gas, a regeneration zone temperature, or the residual carbon concentration on regenerated catalyst.

33 Claims, No Drawings

METHOD OF REGENERATING COKE-CONTAMINATED CATALYST WITH SIMULTANEOUS COMBUSTION OF CARBON MONOXIDE

CROSS-REFERENCE TO RELATED APPLICATION

This application is a continuation-in-part of our co-pending application Ser. No. 654,260, filed Feb. 2, 1976, now abandoned. Other related cases to Ser. No. 654,260 are: Ser. No. 737,358, filed on Nov. 1, 1976, now U.S. Pat. No. 4,108,795; Ser. No. 697,074, filed June 17, 1976, and allowed on Oct. 23, 1978; and Ser. No. 702,636, filed July 6, 1976, and now abandoned.

BACKGROUND OF THE INVENTION

1. Field of the Invention

The field of art to which this invention pertains is hydrocarbon processing and more specifically to a catalytic cracking process. More particularly the present invention is concerned with a method for regenerating a coke-contaminated cracking catalyst with the simultaneous carefully controlled combustion of CO to $CO_2$ within a regeneration zone of a catalytic cracking process.

2. Prior Art

Regeneration techniques in which a coke-contaminated catalyst is regenerated in a regeneration zone occupy a large segment of the chemical arts. Particularly common are regeneration techniques used to regenerate a coke-contaminated fluidizable catalytic cracking catalyst within the regeneration zone of a fluid catalytic cracking (FCC) process. Until recent years the prior art has been primarily concerned with removing the maximum amount of coke from spent catalyst and at the same time preventing excessive temperature levels resulting from the conversion of carbon monoxide to carbon dioxide within certain portions of the regeneration zone, especially in the dilute-phase catalyst region where there is little catalyst present to absorb the heat of reaction and where heat damage to cyclones or other separation equipment can therefore result. Essentially complete CO conversion in conventional regeneration zones was prevented quite simply by limiting the amount of fresh regeneration gas passing into the regeneration zone. Without sufficient oxygen present to support the oxidation of CO to $CO_2$, afterburning simply cannot occur no matter what the temperatures in the regeneration zone. As well, temperatures in the regeneration zone were generally limited to less than about 1250° F. by selecting hydrocarbon-reaction-zone operating conditions of fresh feed streams or recycle streams or combinations thereof to limit the amount of coke on spent catalyst and hence the amount of fuel burned in the regeneration zone. The flue gas produced, containing several volume percent CO, was either vented directly to the atmosphere or used as fuel in a CO boiler located downstream of the regeneration zone. Usual FCC startup practice, familiar to those skilled in the art of FCC processes, was to initially manually regulate the flow of fresh regeneration gas to the regeneration zone in an amount insufficient to sustain essentially complete CO conversion while at the same time limiting regeneration zone temperatures to a maximum of about 1250° F. When reasonably steady-state control of the FCC process was achieved the flow rate of fresh regeneration gas was then typically regulated by instrument control directly responsive to a small temperature differential between the flue gas outlet temperature (or the dilute phase disengaging space temperature) and the dense bed temperature to maintain automatically this proper flow rate of fresh regeneration gas to preclude essentially complete conversion of CO to $CO_2$ anywhere within the regeneration zone. As the temperature difference increased beyond some predetermined temperature difference, indicating that more conversion of CO was taking place in the dilute phase, the amount of fresh regeneration gas was decreased to preclude essentially complete conversion of CO to $CO_2$. This method of control is exemplified by Pohlenz U.S. Pat. Nos. 3,161,583 and 3,206,393. While such method produces a small amount of $O_2$ in the flue gas, generally in the range of 0.1 to 1 vol.% $O_2$, it precludes essentially complete conversion of CO to $CO_2$ within the regeneration zone.

Until the advent of zeolite-containing catalysts, there was little economic incentive for essentially complete conversion of CO to $CO_2$ within the regeneration zone. The use of the zeolite-containing FCC catalysts, which are more stable thermally and which have lower coke-producing tendencies, and the use of higher hydrocarbon conversion zone temperatures, however, often made additional heat input into the FCC process desirable. Typically additional heat was provided by burning external fuel such as torch oil in the regeneration zone or by adding or increasing the amount of feed preheat in external feed preheaters. Thus heat was typically being added to and then later removed from the FCC process by two external installations, a feed preheater and a CO boiler, each representing a substantial capital investment. Catalyst regeneration processes described in the recent prior art have recognized the advantages of essentially completely converting CO to $CO_2$ and recovering at least a portion of the heat of combustion of CO both within the regeneration zone. Examples of such regeneration processes are Stine et al U.S. Pat. No. 3,844,973 and Horecky, Jr. et al U.S. Pat. No. 3,909,392. The advantages of such processes are now well known; such regeneration processes permit the reduction or elimination of feed preheat, the elimination of CO air pollution without the need for external CO boilers, and, when coupled with hydrocarbon-reaction zones of modern design, improved yields of more valuable products.

Regeneration processes employing CO conversion promoters or catalysts are not novel; indeed prior art processes for regenerating fluidizable coke-contaminated cracking catalysts have employed such promoters or catalysts. For example, in the fluid catalytic cracking process described in Kassel U.S. Pat. No. 2,436,927, which issued in 1948, a physical mixture of discrete particles of a cracking catalyst and discrete particles of a supported CO oxidizing catalyst is employed in a dense-phase region of a regeneration zone to enhance CO conversion in the dense phase thus preventing "afterburning" in the dilute-phase region of the regeneration zone. In the process described in Chen U.S. Pat. No. 3,364,136, which issued in 1968, a mixture of a cracking catalyst and a shape-selective crystalline aluminosilicate containing oxidation catalyst within its internal pore structure is used to control the $CO_2$ to CO ratio in the regeneration zone without influencing the reaction taking place in the hydrocarbon reaction zone. In the process described in Wilson U.S. Pat. No.

3,808,121 two separate catalysts of different particle size and composition are employed; a cracking catalyst and a CO oxidation catalyst preferably supported in a matrix material such as alumina spheres and monoliths. Moreover, the supported CO oxidation catalyst is confined within the regeneration zone and does not pass out of that zone to the hydrocarbon reaction zone as does the cracking catalyst. Coke and CO are oxidizing in the regeneration zone to minimize CO in the flue gas.

Thus the prior art regeneration processes have employed CO oxidation promoters in one of two ways: (1) on discrete particles of a matrix or a support, particles to be mixed with the fluid cracking catalyst, and (2) as a part of component of the fluid cracking catalyst itself. Mixtures of cracking catalyst and supported CO oxidation promoter tend to be non-uniform which can result in a CO concentration in the flue gas in excess of allowable emission limitations. The use of a cracking catalyst containing as a component some predetermined concentration of a CO oxidation promoter makes it difficult to achieve in any particular regeneration zone the optimum concentration of oxidation promoter suitable for the operating characteristics of that particular regeneration zone or required to achieve a particular change in a dependent process variable.

By the method of our invention a CO oxidation promoter is added to the regeneration zone independently of the cracking catalyst, coke from spent catalyst is oxidized to produce regenerated catalyst and, essentially simultaneously, CO is converted to $CO_2$ in the presence of the promoter and regenerated catalyst within the regeneration zone. A carbon monoxide oxidation promoter can be easily and precisely added to a regeneration zone, particularly when it is in a liquid, in amounts to control the CO concentration in the flue gas, to control a temperature within the regeneration zone or to control the amount of residual carbon on regenerated catalyst. Addition of a CO oxidation promoter by the method of our invention is therefore more economical than either employing separate particles of supported CO oxidation promoter along with a cracking catalyst or employing a cracking catalyst to which has been added a CO conversion promoter during the catalyst manufacturing procedure. Additionally the method of our invention gives to the refiner as an operating variable what heretofor had been essentially a fixed operating condition. Thus with the method of our invention the refiner has increased operating flexibility. Our method is applicable to any fluid catalytic cracking process, existing or new.

SUMMARY OF THE INVENTION

It is accordingly, a broad objective of our invention to provide a method for regenerating a coke-contaminated catalyst with simultaneous carefully-controlled combustion of CO in a regeneration zone and in a manner to make a controlled quantity of exothermic heat of reaction available for operation of the regeneration zone and to decrease the amount of CO in the flue gas. Another objective of our invention is to provide, in a catalytic cracking process wherein coke-contaminated cracking catalyst and oxygen-containing regeneration gas are passed to a regeneration zone maintained at coke oxidizing conditions to produce a regenerated catalyst and a flue gas containing CO and $CO_2$, a method of using the in situ combustion of CO to $CO_2$ to control the operation of the regeneration zone. Other objectives of our invention are to provide, in a catalytic cracking process wherein coke-contaminated cracking catalyst and oxygen containing regeneration gas are passed to a regeneration zone maintained at coke oxidation conditions to produce a regenerated catalyst and a flue gas containing CO and $CO_2$, (1) a method of controlling the CO concentration in the flue gas within a predetermined CO concentration range; (2) a method of controlling a regeneration zone temperature within a predetermined temperature range and, (3) a method of controlling the concentration of residual carbon on regenerated catalyst within a predetermined residual carbon concentration range.

In brief summary our invention is, in one embodiment, a method for regenerating a coke-contaminated catalyst with simultaneous carefully-controlled combustion of CO which comprises the steps of: (a) introducing coke-contaminated catalyst into a regeneration zone; (b) adding to the regeneration zone, independently of said coke-contaminated catalyst and in an amount selected to promote the combustion of CO to $CO_2$, a liquid comprising water or a hydrocarbon containing a CO oxidation promoter selected from the group consisting of compounds of noble metals soluble in said liquid; (c) passing oxygen-containing regeneration gas into the regeneration zone in an amount selected to burn coke from said coke-contaminated catalyst and to provide sufficient excess oxygen to accomplish the desired amount of CO combustion; (d) reacting a first portion of the oxygen-containing regeneration gas with the coke-contaminated catalyst in the regeneration zone at oxidation conditions which are selected to remove coke from the coke-contaminated catalyst and to produce a flue gas containing CO and which are sufficient to cause combustion of CO to $CO_2$ in the presence of said oxidation promoter; and, (e) simultaneously contacting the flue gas and a second portion of the oxygen-containing regeneration gas with the CO oxidation promoter in the regeneration zone in the presence of regenerated catalyst at said oxidation conditions, thereby (i) making a controlled quantity of exothermic heat of reaction available for operation of said regeneration zone and (ii) decreasing the amount of CO in flue gas.

In brief summary our invention is, in another embodiment, in a process for catalytically cracking a hydrocarbon feed stream wherein coke-contaminated cracking catalyst and oxygen-containing regeneration gas are passed to a regeneration zone maintained at coke oxidizing conditions wherein coke is oxidized to produce a regenerated catalyst and a flue gas containing carbon dioxide and carbon monoxide, a method of using the in situ combustion of CO to $CO_2$ to control the operation of the regeneration zone which comprises the steps of: (a) passing to said regeneration zone, independently of the coke-contaminated catalyst and in an amount selected to initiate and sustain carbon monoxide combustion in said zone in the presence of said regenerated catalyst, a liquid comprising water or a hydrocarbon containing a CO oxidation promoter selected from the group consisting of compounds of noble metals soluble in said liquid; and, (b) thereafter adjusting the amount of oxygen-containing regeneration gas being passed to said zone to a value stoichiometrically sufficient to burn the coke from the catalyst and to convert at least a portion of the CO to $CO_2$, thereby (i) making a controlled quantity of exothermic heat of reaction available for operation of said regeneration zone and (ii) decreasing the amount of CO in the flue gas.

A still further embodiment of our invention is a method for regenerating a coke-contaminated catalyst with simultaneous carefully controlled combustion of CO, in which method the CO combustion rate is optimized by provision and replenishment of a CO-oxidation promoter in a state of less than total assimilation by the catalyst, which comprises the steps of: (a) introducing coke-contaminated catalyst into a regeneration zone; (b) adding to the regeneration zone, independently of said coke-contaminated catalyst and in an amount selected to promote the combustion of CO to $CO_2$ and to provide unassimilated promoter to the regeneration zone, a liquid comprising water or a hydrocarbon containing a CO oxidation promoter selected from the group consisting of compounds of noble metals soluble in said liquid; (c) passing oxygen-containing regeneration gas into the regeneration zone in an amount selected to burn coke from said coke-contaminated catalyst and to provide sufficient excess oxygen to accomplish the desired amount of CO combustion; (d) reacting a first portion of the oxygen-containing regeneration gas with the coke-contaminated catalyst in the regeneration zone at oxidation conditions which are selected to remove coke from the coke-contaminated catalyst and to produce a flue gas containing CO and which are sufficient to cause combustion of CO to $CO_2$ in the presence of said oxidation promoter: (e) simultaneously contacting the flue gas and a second portion of the oxygen-containing regeneration gas with the CO oxidation promoter in the regeneration zone in the presence of regenerated catalyst at said oxidation conditions, thereby (i) making a controlled quantity of exothermic heat of reaction available for operation of said regeneration zone and (ii) decreasing the amount of CO in flue gas; and, (f) replenishing unassimilated promoter within the regeneration zone by repetition of aforesaid step (b) as required to maintain a desired rate of CO-combustion.

Other objects and embodiments of the present invention encompass details about CO conversion promoters, amounts of a CO conversion promoter to be added, methods of adding a CO conversion promoter to the regeneration zone, and operating conditions all of which are hereinafter disclosed in the following discussion of each of these facets of our invention.

DESCRIPTION OF THE INVENTION

At the outset, the definition of various terms used herein will be helpful to an understanding of the method of our invention.

The term "hydrocarbon reaction zone" as used herein is that portion of FCC unit in which a hydrocarbon feed stream is contacted with regenerated catalyst at cracking conditions to produce a mixture of FCC product components, coke-contaminated (or spent) catalyst, and perhaps unreacted feed. Typical FCC product components after separation in equipment downstream of the hydrocarbon reaction zone are: $C_2^-$ fuel gas, $C_3$ and $C_4$ fractions, a gasoline fraction, light cycle oil, and clarified slurry oil. After separation from product components at least a portion of spent catalyst is directed to the regeneration zone. The terms "coke-contaminated catalyst" or "spent catalyst" are used interchangeably and mean catalyst withdrawn from a hydrocarbon conversion zone because of reduced activity caused by coke deposits. Spent catalyst passing into the regeneration zone can contain anywhere from a few tenths up to about 5 wt.% of coke, but typically in FCC operations spent catalyst will contain from about 0.5 to about 1.5 wt.% coke.

The term "regeneratin zone" means that portion of the FCC unit into which an oxygen-containing regeneration gas and at least a portion of spent catalyst are passed in which at least a portion of coke is removed from spent catalyst by oxidation to produce regenerated catalyst and a flue gas containing $CO_2$ and CO. "Regenerated catalyst" means catalyst from which at least a portion of coke has been removed by oxidation. Regenerated catalyst produced when our method is employed will generally contain less than about 0.3 wt.% coke and more typically will contain from about 0.01 to about 0.15 wt.% coke. The term "regeneration gas" as used in this specification shall mean, in a generic sense, any gas which is to contact catalyst or which has contacted catalyst within the regeneration zone. Specifically, the term "oxygen-containing regeneration gas" shall mean a regeneration gas containing free or uncombined oxygen, such as air or oxygen enriched or deficient air, which passes into the regeneration zone to allow oxidation of coke from the spent catalyst and conversion of CO. The term "flue gas" shall mean regeneration gas which has contacted catalyst within the regeneration zone and which passes out of the regeneration zone. Flue gas will contain nitrogen, free-oxygen, carbon monoxide, carbon dioxide and water. Because CO and $CO_2$ concentrations are used in making routine FCC process calculations and since CO is a potential fuel which can be burned within the regeneration zone or an external CO boiler or perhaps both and additionally because air pollution emission limitations may exist for CO, the flue gas is typically characterized by the concentrations of CO and $CO_2$ or by the mole ratio of $CO_2/CO$. Depending upon the operating conditions employed within the regeneration zone, particularly the amount of oxygen-containing regeneration gas passed into the regeneration zone, the concentrations of CO in this gas can vary over a wide range of from a few hundred parts per million or less up to about 15 vol. % or more and the concentration of $CO_2$ can vary from about 5 vol. % to about 20 vol. %. When the regeneration zone is operated at conditions to essentially preclude controlled oxidation of CO within the regeneration zone, the concentrations of CO and $CO_2$ will be approximately equal, each within the range of from about 7 to about 15 vol. %, and the $CO_2/CO$ mole ratio will be in the range of from about 0.8 to about 1.5. When the regeneration zone is operated at conditions to achieve partially complete oxidation of CO, the concentration of CO will be lower than that of $CO_2$ and more specifically the $CO_2/CO$ mole ratio will typically be from about 1.5 to about 100. When the regeneration zone is operated at conditions to achieve essentially complete combustion of CO within the regeneration zone the CO concentration will typically be less than about 1000 ppm. and preferably less than 500 ppm. and the $CO_2/CO$ mole ratio will be greater than about 100.

The terms "dense-phase" and "dilute-phase" are commonly-used terms in the art of FCC to generally characterize catalyst densities in various parts of the regeneration zone or the hydrocarbon-reaction zone. While the demarcation density is somewhat ill-defined, as the term "dense-phase" is used herein it shall refer to regions within the regeneration zone where the catalyst density is greater than about 5 lb/ft$^3$, and as "dilute-phase" is used herein it refers to regions where the catalyst density is less than about 5 lb/ft$^3$. Usually the dense-phase density will be in the range of from about 5 to 35 lb/ft$^3$ or more and the dilute-phase density will be much less than 5 lb/ft$^3$ and in the range of from about 0.1 to about 5 lb/ft$^3$. Catalyst densities within regeneration zones are commonly measured by measuring pressure or head differences across pressure taps installed in the vessels and spaced at known distances apart.

The term "afterburning" as generally understood by those skilled in the art means the unintentional, uncontrolled oxidation of CO to $CO_2$ in the dilute-phase region of the regeneration zone or the flue gas line, where there is little catalyst available to act as a heat sink. Since the heat of reaction of CO oxidation is very exothermic (about 4350 BTU/lb. CO oxidized), afterburning can therefore result in severe damage to catalyst separation devices located in the dilute-phase. Generally afterburning is characterized by a rapid temperature increase and occurs during periods of unsteady state operations or process "upset". It is, therefore, usually of short duration until steady state operations are resumed.

In contrast to afterburning, the terms "controlled conversion of CO" or "controlled oxidation of CO" shall refer to the intentional, controlled and sustained oxidation of CO in the presence of sufficient catalyst to absorb at least a portion of the heat of reaction thereby recovering at least a portion of the heat of reaction and precluding damage to regeneration zone equipment. Depending upon the operating conditions employed, the controlled oxidation of CO can be partially complete or essentially complete. "Partially complete" shall mean that the CO concentration in the flue gas has been reduced such that the $CO_2/CO$ mole ratio of the gas is in the range of from about 1.5 to 100. "Essentially complete" conversion of CO shall mean that the CO concentration of the gas has been reduced such that the $CO_2/CO$ mole ratio is greater than about 100. Typically essentially complete CO conversion will produce CO concentrations less than about 1000 ppm. and more preferably less than about 500 ppm.

The terms "CO conversion promoter" or "CO oxidation promoter" or simply "promoter" shall means a substance which catalyzes the oxidation of CO to $CO_2$. With a CO conversion promoter the kinetic rate constant for the oxidation of CO to $CO_2$ may be increased typically from 2 to 5 times or even much more. Thus a faster rate of CO conversion can be obtained at conversion conditions in the presence of a CO conversion promoter than can be obtained at the same conversion conditions without the promoter. Conversely the same rate of CO conversion can be obtained at conversion conditions (such as temperature) which are less severe than those required without the CO conversion promoter.

The amount of CO oxidation promoter added to a regeneration zone may be expressed as that required to produce some desired change in a variable or it may be expressed in terms of circulating catalyst inventory or catalyst circulation rate or fresh cracking catalyst makeup rate or perhaps in terms of a barrel of feedstock. In this specification an amount of promoter is typically expressed as that amount required to produce a desired change in a variable such as temperature, CO concentration or residual carbon concentration or is expressed as wt. ppm. of circulating catalyst inventory. The term "circulating catalyst inventory" means that amount of cracking catalyst in the FCC process which can be circulated from the regeneration zone to the hydrocarbon reaction zone and back again. It differs from the total cracking catalyst inventory because there is usually some portion of the total inventory that is unavailable for circulation, such as that portion of the total inventory typically located in the cone section of the regeneration zone under the pipe grid.

With these terms now in mind, we consider briefly typical present-day FCC operations with particular emphasis on the regeneration zone operation. Present-day FCC operations have achieved a significant reduction in coke yield by the wide-spread use of crystalline aluminosilicate cracking catalysts and by the use of short hydrocarbon-catalyst contact times as exemplified by riser cracking. While this achievement has resulted in high yields of more valuable gaseous and liquid products, and reduced the coke make, a sufficient amount of heat must still be produced within the regenerator for the heat balance requirements imposed by a wide range of operating conditions and feedstocks. Such CO burning also made possible further reductions in coke yields and increases in gaseous and liquid product yields and/or permitted reductions in or elimination of feed preheat while at the same time eliminating a CO pollution problem without the need for an external CO boiler. Typical present-day regeneration zones comprise a single cylindrical vessel containing a dilute phase in the upper portion of the vessel in which are located cyclone separation devices and a dense phase in the lower portion of the vessel. Spent catalyst enters the side or bottom of the vessel and fresh regeneration gas enters the bottom of the vessel and is dispersed within the dense phase by a pipe grid or perforated plate arrangement. Coke is oxidized to produce regenerated catalyst and flue gas containing CO and $CO_2$, and CO may be oxidized in the presence of sufficient catalyst to recover at least a portion of the heat of combustion. Flue gas containing entrained catalyst passes upward out of the dense phase into the dilute phase where cyclone separation devices separate entrained catalyst and direct it toward the dense phase and direct separated flue gas out of the regeneration zone. Constraints or limitations on the operation of the regeneration zone include air blower capacity, cyclone separator loading limitations, flue gas CO and particulate emission limitations, and vessel temperature limitations. During regeneration zone operation the refiner is primarily concerned with and closely monitors the degree of catalyst regeneration, the regeneration zone temperatures and the concentration of CO and particulates in the flue gas. Specifically, it is typical refinery practice to periodically withdraw regenerated catalyst samples and analyze them, by methods well known at the art, for residual carbon content as a measurement of the degree of catalyst regeneration and an indication of the cracking activity of the regenerated catalyst. Regeneration zone temperatures are routinely measured, typically by means or thermocouples, and recorded to detect changes in operation and to ensure that vessel metallurgy limitations are not exceeded. Additionally it is typical practice to periodically (or continuously) sample and analyze the flue gas for the concentrations of CO, $O_2$, $CO_2$ and particulate matter. Gas analyses may be by any method or methods known and used in the art, including the Orsat method, gas chromatogrpahy methods and mass spectroscopy methods. Particulate material may be determined by the opacity measurements or by other methods of analyses known to the art. Results from gas analyses can be used to calculate, by carbon-nitrogen-oxygen balance, such data as coke composition, coke burning rate, oxygen-containing regeneration gas requirement, heat of combustion of coke, and the amount of CO which may be burned in an external CO boiler or in the FCC regeneration zone or perhaps in both. Before the flue gas can be vented directly to the atmosphere the refiner must also know the CO and particulate concentrations to determine if the flue gas meets local CO air pollution emission limitations. The concentration of $O_2$ in the flue gas is important to ensure that the amount of oxygen-containing regeneration gas being supplied to the regeneration zone is sufficient to support the degree of CO combustion desired, whether it be partially complete or essentially complete, but not in such large excess as would be an unnecessary use of oxygen-containing regeneration gas blower capacity.

It is a feature of the method of our invention in all its embodiments that a CO oxidation promoter is added to the regeneration zone independently of the cracking catalyst. Carbon monoxide oxidation promoters which can be used include metals of Groups IB, IIB, VIB, VIIB, and VIII of the Periodic Table of Elements as well as compounds thereof. Representative metals include chromium, nickel, iron, molybdenum, cobalt, copper, zinc, manganese and vanadium as well as compounds thereof. Preferred CO oxidation promoters are the noble metals and compounds thereof because we have found that very small quantities of these promoters are required to achieve the desired results. The term "noble metals" as commonly understood and used herein are the metals gold, silver, mercury, platinum, palladium, iridium, rhodium, ruthenium and osmium. A promoter may be added to the regeneration zone as a solid such as a powder, or as shavings or pellets or agglomerates, but preferably the promoter will be added in a liquid for ease of handling and control. A liquid containing a promoter may be added continuously or intermittently by fluid-flow and control devices well known to the chemical art. As examples, the liquid containing a promoter may be pressured out of a cylinder or "bomb" attached with piping or tubing to a torch oil nozzle or to a probe inserted through a pressure tap with flow controlled with a valve located in the connecting piping. Alternatively the liquid could be pumped out of a cylinder at a rate controlled with a small positive displacement pump into the nozzle or probe. The CO conversion promoter may be dispersible in the liquid as a colloidal dispersion or suspension or may be soluble in the liquid. Particularly preferred oxidation promoters are noble metals or compounds thereof that are soluble or dispersible in water or a liquid hydrocarbon. Suitable water-soluble metal compounds include the metal halides, preferably chlorides, nitrates, amine halides, oxides, sulfates, phosphates and other water-soluble inorganic salts. Specific examples of water-soluble compounds are chloroplatinic acid, palladic acid, palladium chloride, ruthenium tetrachloride, rhodium trichloride, rhodium nitrate and osmium trichloride. Alternatively, a liquid hydrocarbon containing an oil-soluble or oil dispersible CO oxidation promoter may be added to the regeneration zone. Suitable liquid hydrocarbons include those normally liquid at atmospheric temperatures and pressure such as, for example, naphthas and light cycle oil. Oil soluble or oil dispersible compounds include metal diketonates, carbonyls, metallocenes, olefin complexes, acetylene complexes, alkyl or aryl phosphine complexes and carboxylates. Specific examples of these are platinum acetylacetonate, palladium acetate, palladium naphthenate, triiodoiridium (III) tricarbonyl, and ($\pi$, cyclopentadienyl) (ethylene) rhodium (I). Of the noble metals and compounds thereof platinum and palladium and compounds thereof are preferred, particularly those which are water soluble since they tend to be more readily available than those compounds which are oil soluble or oil dispersible. Chloroplatic acid and palladic acid are especially preferred water-soluble platinum and palladium compounds.

While our concept of promotion of CO oxidation encompasses addition of promoter at any point in the catalyst circulation system, to best insure maxium utilization of the very small amounts of promoter that are required, applicants prefer to restrict the addition of the promoter to the regeneration zone. By adding the promoter directly to the regeneration zone, where CO oxidation to be catalyzed is occurring, almost immediate response results making available for operation of the regeneration zone a controlled quantity of exothermic heat of reaction and decreasing the concentration of CO in the flue gas. The CO conversion promoter may be added to the dense phase or to the dilute phase of the regeneration zone. While the promoter may be added through multiple addition points we have found that satisfactory results can be obtained when only one addition point is used. The typical regeneration zone vessel contains a number of pressure taps and torch oil nozzles any one or more of which can serve as an addition point and thus very little modification to the vessel itself is required before our method can be used.

One embodiment of our invention is a method for regenerating coke-contaminated catalyst with simultaneous carefully-controlled combustion of CO. In this embodiment of our invention coke-contaminated catalyst is introduced into the regeneration zone and a CO oxidation promoter is added to the regeneration zone independently of the coke-contaminated catalyst in an amount selected to promote the combustion of CO to $CO_2$. The amount of promoter added will be equivalent to about 0.1 to about 25 wt. ppm. of the circulating catalyst inventory on an elemental metal basis and more preferably within the range of from about 0.1 to about 15 wt. ppm. of the circulating catalyst inventory. Oxygen-containing regeneration gas will then be passed into the regeneration zone in an amount to provide sufficient excess oxygen to accomplish the desired amount of CO combustion. More specifically, this amount of oxygen-containing regeneration gas will be equivalent to about 10 to about 17 pounds of air per pound of coke entering the regeneration zone per unit time, depending upon whether the CO combustion is to be partially complete or essentially complete. We have found that it is important that the promoter be added first to the regeneration zone and then the rate of oxygen-containing regeneration gas be adjusted so that smooth, controlled, catalyzed conversion of CO can be initiated from the start and the risk of afterburning minimized. If that amount of oxygen-containing regeneration gas is added to the regeneration zone first and the promoter added secondly there is the risk that afterburning will be initiated first rather than the desired controlled conversion of CO in the presence of promoter and regenerated catalyst. A first portion of the oxygen-containing regeneration gas will then be reacted with the coke-contaminated catalyst in the regeneration zone at oxidation conditions selected to remove coke from the catalyst and to produce a flue gas containing CO and sufficient to cause combustion of CO to $CO_2$ in the presence of the oxidation promoter. Oxidation conditions will include, in addition to the presence of the oxygen-containing regeneration gas described above, temperatures within the range of from about 1100° F. to about 1450° F. and a pressure within the range of from about atmospheric to about 50 psig. At such conditions coke oxidation will be essentially spontaneous. Essentially simultaneously the flue gas and a second portion of the oxygen-containing regeneration gas will be contacted with the CO oxidation promoter at the oxidation conditions previously described thereby making a controlled quantity of exothermic heat of reaction available for operation of the regeneration zone and decreasing the amount of CO in the flue gas. The amount of oxidation promoter added to the regeneration zone may be that required to obtain certain desirable results, such as a desired concentration of CO in the flue gas or a desired degree of catalyst regeneration or a desired regenerated-catalyst temperature or a desired regeneration-zone temperature. When the amount of CO oxidation promoter is to be added to achieve such a result, promoter will usually be added in small increments and the desired dependent variable—whether CO concentration or residual carbon concentration on regenerated catalyst, or a temperature—measured and compared with the desired result to determine whether another increment of CO oxidation promoter is needed. Specifically, if after adding a small increment of promoter to the regeneration zone the measured concentration of CO in the flue gas or the concentration of residual carbon on regenerated catalyst or the regenerated-catalyst temperature or a regeneration-zone temperature is not with a predetermined range for each, a second increment of promoter will be added and if necessary additional increments will be added until the measured variable falls within the predetermined range. Adding the promoter in several small increments, each over a relatively short period of time of from a few minutes to a few hours, allows the refiner to more closely control and monitor the operation of the regeneration zone to achieve the desired result. When the promoter is added in several increments the total amount of promoter will be within the ranges previously described. Where the desired variable to be controlled is a dilute-phase temperature such as a flue gas temperature a CO oxidation promoter can be added in conjunction with an amount of a diluent gas to enable control of the temperature below a predetermined level. The diluent gas will usually be oxygen-containing regeneration gas. Once the measured variable is within or less than the predetermined range for that variable then the promoter will be added continuously or intermittently as necessary to maintain the measured variable within the predetermined range. While the amounts of promoter required to maintain a variable within a predetermined range can vary somewhat from unit to unit and is best determined by operating experience on a particular unit, we have found that the amount of promoter necessary on an average daily basis to maintain a variable within a predetermined range will be equivalent to about 0.005 to about 10 wt. ppm. of the circulating catalyst inventory on an elemental metal basis.

Other embodiments of our invention are specific, independent methods of control intended to be employed after initial startup of the FCC process and after reasonably steady-state process operation has been achieved. Specifically, in one embodiment our invention is, in a process for catalytically cracking a hydrocarbon feed stream wherein coke-contaminated catalyst and oxygen-containing regeneration gas are being passed into a regeneration zone maintained at oxidizing conditions and coke is being oxidized to produce regenerated catalyst and a flue gas containing $CO_2$ and CO, a method of controlling the CO concentration in the flue gas within a predetermined CO concentration range; in another embodiment our invention is, in such a process, a method of controlling a regeneration-zone temperature within a predetermined range; and, in another embodiment our invention is, in such a process, a method of controlling the concentration of residual carbon on regenerated catalyst within a predetermined range. Such control methods can be employed by a refiner independently of each other. For instance, one refiner may be primarily interested in controlling the CO concentration in the flue gas within a predetermined range and, if the regeneration zone metallurgy is such that expected temperatures pose no problem, he will accept the regeneration zone temperatures and degree of regeneration that result when the CO concentration is controlled. Another refiner may be primarily concerned about regeneration-zone temperatures because of metallurgy limitations. In one embodiment of our invention he can control a regeneration-zone temperature within a predetermined range and he will accept the flue gas CO concentration and degree of regeneration that result from such control. In each of these control methods, a CO oxidation promoter is first passed to the regeneration zone and then oxygen-containing regeneration gas is passed to the regeneration zone in an amount stoichiometrically sufficient to convert at least a portion of the CO to $CO_2$. As previously mentioned the order of addition is important to avoid the risk of afterburning. At least a portion of the CO is then converted at conversion conditions including the presence of the CO oxidation promoter and regenerated catalyst to produce flue gas containing $CO_2$ and CO. Conversion conditions will include a temperature within the range of from about 1100° F. to about 1450° F. and a pressure within the range of from about atmospheric to about 50 psig. Then, depending upon the control method, the flue gas will be analyzed to determine a measured CO concentration which will be compared with a predetermined CO concentration range or a regeneration-zone temperature will be measured and compared with a predetermined regeneration-zone temperature range or regenerated catalyst will be analyzed to determine a measured residual carbon concentration which will be compared to a predetermined residual carbon concentration range. Thereafter promoter in combination with the required amount of oxygen-containing regeneration gas will be passed to the regeneration zone in amounts to maintain either the CO concentration or a regeneration-zone temperature or a residual carbon concentration within their respective predetermined ranges. The initial amount of promoter added to the regeneration zone will preferably be added in small increments as previously described until the desired result is achieved. The total of such increments will be equivalent to about 0.1 to about 25 wt. ppm. of the circulating catalyst inventory on an elemental metal basis and preferably within the range of from about 0.1 to about 15 wt. ppm. of the circulating catalyst inventory. The amount of promoter necessary on an average daily basis to maintain a measured variable within a predetermined range will typically be equivalent to about 0.005 to about 10 wt. ppm. of the circulating catalyst inventory on an elemental metal basis.

The type of cracking catalyst used in FCC processes employing the method of this invention is not critical and can be any type of cracking catalyst used or intended for use in the FCC process including the amorphous catalysts or crystalline aluminosilicate catalysts or mixtures of the two. Of the two broad types of cracking catalysts, those comprising crystalline aluminosilicates are preferred because of the reduced coke yields and increased gaseous and liquid product yields they produce as compared to those obtained with amorphous catalysts. Since CO is now oxidized as a fuel in addition to coke within the regeneration zone and at least a portion of the heat of CO combustion is recovered within the regeneration zone, the cracking system of the FCC process can now be as selective for more valuable products as the hydrocarbon conversion zone operating conditions and the cracking catalyst will permit. Hydrocarbon conversion zone operating conditions will therefore be selected for maximum gaseous and liquid product yields and will typically include a temperature within the range of from about 800° F. to about 1100° F., a pressure within the range of from about atmospheric to about 50 psig., a catalyst to oil ratio of from about 3 to about 20 and a hydrocarbon residence time in contact with catalyst of from about 1 to about 30 seconds and more preferably from about 1 to about 10 seconds. Feedstocks used in FCC processes employing the method of this invention need be no different than those used in processes not employing our method and can include any conventional hydrocarbon feedstock such as naphthas, gas oils, light and heavy distillates, residual oils and the like.

The following examples are intended for illustration purposes and references to specific promoters, concentrations of promoters, operating conditions or methods of addition to the regeneration zone are not to be construed as unnecessary limitations upon the scope and spirit of the claims attached hereto.

EXAMPLE I

This example describes pilot plant regeneration zone tests that were performed to establish the effectiveness of adding a liquid containing low concentrations of particular promoters to the regeneration zone of an FCC unit for reducing the concentration of CO in the flue gas. The tests were conducted using a vertical tubular vessel the upper end of which was fitted with a porous stainless steel filter for confining within the vessel during the operation sequence the catalyst sample that was loaded into the vessel and the lower end of which contained an inlet means for the fluidizing medium (nitrogen or air) and an inlet means for the liquid containing the promoter. Provision was made to heat the vessel to a constant temperature and chromatographic equipment was provided to sample and analyze the flue gas from the vessel for CO, $CO_2$ and $O_2$ thereby providing an instantaneous composition to characterize the reduction in the CO concentration.

Each test was run with a 500 gram sample of spent zeolite-containing cracking catalyst which contained about 0.9 wt.% coke. The coke had been deposited on the catslyst by passing gas oil feedstock over cleanly regenerated catalyst in a pilot plant scale hydrocarbon reaction zone operated at a standard set of operating conditions with a predetermined sequence of operating steps.

For Test 1 no liquid containing a promoter was added to the vessel during the operating sequence; the test was conducted to establish a basis for comparision with tests where the method of the invention was employed. A 500 gram sample of spent catalyst was loaded into the vessel and fluidized with nitrogen entering the bottom of the vessel while the system was heated to a temperature of 1100° F. At a specified time nitrogen was replaced with air thereby initiating the oxidation of coke. The flue gas from the vessel had CO concentrations as determined by the chromatographic equipment at various times after introducing air as indicated in Table I:

TABLE I

| Test 1 Effluent Gas CO Concentrations | | |
|---|---|---|
| Time (min.) | % CO in dry flue gas | $CO_2/CO$ Ratio |
| 1 | 2.4 | 3.09 |
| 2 | 3.5 | 3.00 |
| 3 | 5.0 | 2.86 |
| 4 | 6.0 | 2.58 |
| 5 | 5.7 | 2.95 |

As shown above, the $CO_2/CO$ ratio during the test remained in the rather narrow range of from about 2.5 to about 3.0.

Test 2 was conducted in the same manner as Test 1 except that 15 seconds after the fluidizing nitrogen was switched to air, and while the CO concentration was observed to be increasing, a 30 cc. sample of dilute chloroplatinic acid ($H_2PtCl_6$) containing 0.1 mg. Pt/cc was injected into the vessel. This amount of chloroplatinic acid is equivalent to about 6.0 wt. ppm. of the catalyst as Pt metal. From instantaneous chromatographic readings it became apparent that the CO concentration was now being reduced. As the test continued the flue gas had the following compositions:

TABLE II

| Test 2 Effluent Gas CO Concentrations | | |
|---|---|---|
| Time (min.) | % CO in dry flue gas | $CO_2/CO$ Ratio |
| 1 | 1.7 | 9.3 |
| 2 | <0.1 | >100 |
| 3 | <0.1 | >100 |

Carbon monoxide concentrations are much reduced and $CO_2/CO$ ratios are much higher than those of Test 1 for the same time intervals. To test how quickly the platinum lost effectiveness for reducing the CO concentration, the regenerated catalyst from Test 2 was used for additional cycles in a pilot plant scale hydrocarbon reaction zone and then in the regeneration zone with no addition of promoter. After the first three additional cycles through the hydrocarbon reaction zone and regeneration zone essentially no CO formation was noted as the coke was burned, but starting with the fourth cycle a small quantity of CO was present in the flue gas although the amount was considerably less than that for Test 1 when no promoter was used.

The same procedure was employed with a new 500 gram catalyst sample for Test 3 except that a more dilute solution was utilized and the liquid containing the promoter was added to the vessel just before the fluidizing nitrogen was switched to air. In this test 25 cc. of more dilute chloroplatinic acid (0.01 mg Pt/cc), equivalent to about 0.5 wt. ppm. of the catalyst as Pt metal, were added to the vessel. Flue gas concentrations were as follows:

TABLE III

Test 3 Effluent Gas CO Concentrations

| Time (min.) | %CO in dry flue gas | CO₂/CO Ratio |
|---|---|---|
| 1 | 0.6 | 20.8 |
| 2 | <0.1 | >100 |
| 3 | <0.1 | >100 |

Although the reduced amount of promoter used in this test appeared to produce results comparable to those obtained with a higher promoter concentration in Test 2, the regenerated catalyst appeared to lose much of its promoter effectiveness very quickly as subsequent cycles showed the presence of some CO during the regeneration sequence. After three cycles it appeared that the catalyst produced about two-thirds as much CO as was produced during Test 1 when no promoter was added.

In Test 4, 25 cc. of dilute palladic acid containing 0.1 mg. Pd/cc, equivalent to about 5 wt. ppm. of the catalyst as Pd metal, was injected into the vessel 15 seconds after the fluidizing nitrogen had been switched to air thus initiating combustion. Within two minutes the CO concentration in the flue gas had fallen to less than 0.2 vol.%.

EXAMPLE II

This example describes the behavior of a regeneration zone of a commercial fluid catalytic cracking process shortly after the addition of small amounts of a CO oxidation promoter by the method of our invention without any other operational changes being made.

The particular FCC unit was processing about 18,670 B/D of a mixture of vacuum and coker gas oils and had a circulating catalyst inventory of about 60 tons of zeolite-containing catalyst. The unit was lined out at typical operating conditions without attempting to partially or essentially completely reduce the CO concentration in the flue gas and without the presence of a CO conversion promoter in the regeneration zone. A summary of some of these process operating conditions before any promoter was added to the regeneration zone are shown in Table IV below. Two liters of very dilute chloroplatinic acid were then pressured out of a cylinder into the regeneration zone within a 2-3 minute period through an instrument density tap located in the regeneration zone. The diluted chloroplatinic acid was prepared by diluting 61.4 grams of concentrated chloroplatinic acid (28.637 wt.% Pt) to two liters volume using distilled water. This is equivalent to about 0.32 wt. ppm. of circulating catalyst inventory as Pt metal. The regeneration zone almost immediately responded to this addition; the CO concentration in the flue gas was reduced to about half of that before promoter was added and the regeneration zone dense-phase temperature rose about 45° F. of that before the addition of promoter. No other operational changes to the process were made. A summary of operating conditions after this first addition of promoter is shown in Table IV. Several hours later a smaller addition of promoter equivalent to about 0.13 wt. ppm. of circulating catalyst inventory as Pt metal was added to the regeneration zone in the same manner as the first addition. Except for the addition of the promoter no other operational changes were made to the process. A summary of operating conditions shortly after this second addition is also shown in Table IV below.

TABLE IV

Response of Regeneration Zone to Addition of Promoter Selected Operating Conditions

| | Start | After Addition of 0.32 wt. ppm. Pt | After Addition of 0.13 wt. ppm. Pt. |
|---|---|---|---|
| Temperatures, °F. | | | |
| Regeneration zone dense phase | 1211 | 1257 | 1316 |
| Regeneration zone dilute phase | 1221 | 1268 | 1323 |
| Regeneration zone flue gas | 1233 | 1253 | 1298 |
| Hydrocarbon reactor zone | 950 | 952 | 952 |
| Combined feed | 623 | 623 | 624 |
| Flue Gas Composition, Vol.% | | | |
| CO | 10.5 | 5.9 | 1.4 |
| CO₂ | 10.8 | 12.8 | 17.1 |
| O₂ | 0.0 | 0.0 | 0.0 |
| CO₂/CO | 1.03 | 2.17 | 12.2 |
| Residual Carbon on Regen. Catalyst, wt.% | 0.30 | 0.16 | 0.06 |
| Fresh Feed Rate, BPSD | 18670 | 18670 | 18670 |
| Recycle Rate, BPSD | 1654 | 1654 | 1654 |
| Air Rate, SCFM | 30822 | 30822 | 30228 |

As shown by the data in Table IV, the CO concentration in the flue gas decreased from 10.5 vol.% before any promoter addition to 5.9 vol.% after the addition of 0.32 wt. ppm. Pt to 1.4 vol.% after another addition of 0.13 wt. ppm. Pt. Carbon on regenerated catalyst decreased from 0.30 wt.% to 0.16 wt.% after the first promoter addition and then to 0.06 wt.% after the second promoter addition while the regeneration zone dense phase temperature increased from 1211° F. to 1257° F. to 1316° F. after the respective promoter additions. Other regeneration zone temperatures increased also but not as much as did the dense-phase temperature.

EXAMPLE III

This example describes the use of the method of our invention in the same commercial unit as was used in Example II and indicates the advantages obtained by such use. Before the two promoter additions were made as described in Example II, a rather complete test, Test 1, was conducted for comparison with subsequent tests to be made when the method of the invention was used. During the day following the first two additions of promoter two more additions of promoter, equivalent respectively to adout 0.13 and 0.32 wt. ppm. of the circulating catalyst inventory as Pt metal, were made in the manner previously described and the air rate to the regeneration zone was increased to ensure sufficient oxygen for essentially complete conversion of CO to CO₂. During steady state operation, when CO was being essentially completely burned within the regeneration zone in the presence of CO conversion promoter added by the method of our invention and in the presence of regenerated catalyst, Test 2 was then conducted. At the time of Test 2 the total amount of diluted chloroplatinic acid which had been added to the regeneration zone was equivalent to about 0.9 wt. ppm. of the circulating catalyst inventory as Pt metal. Test 2 was run at essentially the same feed rate, regeneration zone and hydrocarbon reaction zone pressures as those for Test 1. No attempt was made before starting Test 2 to achieve the same conversion level as that obtained for Test 1 nor was any attempt made to optimize the flow-rate of air needed to achieve essentially complete CO conversion. Results for Test 1 and Test 2 are shown in Table V.

TABLE V

COMPARATIVE FCC OPERATIONS BEFORE AND AFTER ADDITION OF CO CONVERSION PROMOTER

| TEST | 1 Before | 2 After |
|---|---|---|
| Processing Conditions | | |
| Hydrocarbon Reaction zone | | |
| Temp., °F. | 950 | 941 |
| Combined Feed temp., °F. | 623 | 595 |
| Regeneration Zone | | |
| Dense phase temp., °F. | 1212 | 1284 |
| Dilute phase temp., °F. | 1222 | 1290 |
| Flue gas temp., °F. | 1233 | 1310 |
| Carbon on Regen. Cat., wt. % | 0.28 | 0.11 |
| Flue Gas Analysis, vol.% | | |
| $CO_2$ | 10.5 | 14.1 |
| CO | 9.6 | <0.1 |
| $O_2$ | 0.0 | 3.5 |
| $CO_2/CO$ | 1.09 | >140 |
| Product Yields | | |
| $C_2$ and lighter, wt. % | 2.7 | 2.4 |
| Propylene, vol. % | 8.5 | 8.2 |
| Propane, vol. % | 2.5 | 2.5 |
| Isobutane, vol. % | 6.1 | 5.5 |
| N-butane, vol. % | 1.7 | 1.6 |
| Butenes, vol. % | 9.1 | 9.2 |
| $C_5$ + Gasoline, vol. % | 57.6 | 57.4 |
| Light Cycle Oil, vol. % | 20.1 | 21.2 |
| Slurry Oil, vol. % | 3.1 | 3.8 |
| Coke, wt. % | 5.4 | 4.3 |
| Conversion, vol. % | 79.7 | 78.0 |

A comparison of the test data shows a reduction in the CO concentration of the flue gas from 9.6 vol.% to <0.1 vol.%, a reduction in carbon on regenerated catalyst of from 0.28 wt.% to 0.11 wt.% (indicating a better catalyst regeneration) and a general increase in regeneration zone temperatures of from about 70 to 80° F. by using the method of our invention. Although the hydrocarbon reaction zone temperatures are not quite the same, recovery of a portion of the heat of CO combustion within the regeneration zone in Test 2 has permitted a reduction in the combined-feed temperature. Although the conversion for Test 2 was about 1.7% less than that of Test 1, a comparison of the yields indicates that more selective cracking to more valuable products was obtained for Test 2 than for Test 1. The coke yield for Test 2 was 4.3 wt. % compared to 5.4 wt. % for Test 1 and even though conversion was 1.7% less for Test 2 than for Test 1 the gasoline yield for Test 2 was 57.4 vol. % compared to 57.6 vol. % for Test 1.

Experience on this same commercial unit demonstrated that essentially complete conversion of CO could be maintained by adding to the regeneration zone amounts of promoter on an average daily basis equivalent to about 0.12 wt. ppm. of the circulating catalyst inventory as Pt metal.

EXAMPLE IV

This example describes the use of our invention in the same commercial unit as was used in Example III and indicates a phenomenal, localized and temporal effect which takes place within a regenerator in the vicinity of the point of injection of our promoter. We are not certain of the precise mechanism by which our injection of promoter directly into the regenerator, independently of the spent catalyst stream injected thereto, provides an enhanced CO-oxidation effect. However, we believe that it relates to the existence within the regenerator both of CO-oxidation promoter material which is not yet fully assimilated upon or within the FCC catalyst and assimilated promoter. We also believe that as the unassimilated promoter material becomes absorbed by, or assimilated by, the FCC catalyst its efficacy for promotion of CO-oxidation is diminished. The subject regenerator had two cyclone assemblies provided for the separation of flue gas from regenerated catalyst. Temperature measuring devices were provided in each of the assemblies of cyclones.

In the test of this Example we injected a promoter solution into the dilute phase of the regenerator at a location in the vicinity of one of the cyclone assemblies. We monitored the effect of this injection by recording temperatures in the two cyclone assemblies and flue gas composition, all as a function of time, just before and at intervals after the injection of the promoter. The temperature measuring device in the cyclone near the injection point registered a dramatic increase in temperature, signifying dramatically increased CO oxidation in the region of the injection point. The other cyclone assembly also registered a significant rise in temperature, however its rise was of lesser magnitude. Note that the difference in magnitude of the temperature rises noted in the two cyclone assemblies is *not totally* attributable to our promoter's efficacy.

It is to be carefully noted that the point of introduction of spent catalyst into the subject regenerator was nearer the cyclone of lesser temperature effect. Since the spent catalyst introduction point corresponded to the region of highest coke appearance in the regenerator, and therefore the region of greatest coke oxidation, it follows that greater oxygen consumption was taking place there. There was, therefore less residual oxygen available in this region for the oxidation of CO. Now, this means that, all other things being equal, the effect of promoter injection upon the temperature in the cyclone assembly nearer the promoter injection point is necessarily greater, due to the greater amount of residual oxygen present, than the effect upon the temperature in the cyclone assembly nearer the spent catalyst injection point. However, the temperature rise in the vicinity of the promoter injection point is demonstrably greater than what would be expected when taking the oxygen availability into account. We know this by a comparison of temperatures in the two cyclone assemblies at differing states of assimilation of promoter upon the catalyst, that is at 24 hours after promoter injection as compared to one hour after injection of the promoter.

We found that 24 hours after injection, when at least some assimilation of promoter by the catalyst must have taken place, the cyclone near the injection point ran 71° F. hotter than the cyclone near the spent catalyst inlet. This is doubtlessly an indication of the effect of oxygen availability. Previously, however, viz. one hour after promoter injection, the injection point cyclone ran 91° F, hotter than the spent catalyst inlet cyclone. This, we believe, is a manifestation of the phenomenal, localized and temporal effect associated with our independent addition of promoter to the regenerator and of its efficacy for CO-oxidation. Table VI, below, shows the data which we recorded in this test.

TABLE VI

| | Before Injection | 1 Hour After Injection | 1 Day After Injection |
|---|---|---|---|
| Feed Rate, BPSD | 17,400 | Same | Same |
| Reactor Temp., °F. | 958 | 961 | 959 |
| Combined Feed Temp., °F. | 642 | 642 | 623 |
| Reg. Dense, °F. | 1198 | 1246 | 1226 |

TABLE VI-continued

|  | Before Injection | 1 Hour After Injection | 1 Day After Injection |
|---|---|---|---|
| Reg. Dilute, °F. | 1207 | 1254 | 1235 |
| NE Cyclone, °F. | 1178 | 1283 | 1270 |
| SW Cyclone, °F. | 1150 | 1192 | 1199 |
| Flue Gas, °F. | 1186 | 1255 | 1263 |
| Carbon/Reg. Cat., Wt. % | 0.30 | 0.17–0.21 | 0.24 |
| Flue Gas, Mol. % | | Average | Average |
| CO | 10.5 | 5.7 | 8.1 |
| $CO_2$ | 11.2 | 13.1 | 12.8 |
| $N_2$ | 77.3 | 80.1 | 78.1 |
| A | 0.9 | 0.9 | 0.9 |
| $O_2$ | 0.1 | 0.2 | 0.1 |
| $CO_2/CO$ | 1.06 | 2.30 | 1.58 |

Table VI shows a set of data measurements before injection, one hour after injection and one day after injection of promoter independently into the regenerator. The unit was processing 17,400 barrels of feed per day throughout the tests. The northeast cyclone, "NE Cyclone", was located near the promoter injection point, and the southwest cyclone, "SW Cyclone", was located near the spent catalyst inlet point. First, notice that the 2.30 $CO_2/CO$ ratio at one hour after injection indicates greater CO oxidation than that occurring at 24 hours after injection, evidenced by a 1.58 $CO_2/CO$ ratio. Note also that the differential in temperature between the northeast and southwest cyclones was 91° F. one hour after injection and had diminished to only 71° F. by 24 hours after injection. Other indications, such as the dense and dilute phase temperatures, "Reg. Dense", "Reg. Dilute", and carbon levels on regenerated catalyst, "carbon/reg. cat.", also indicate that the independent addition of our promoter gave a heightened, though temporal, effect. We believe that 24 hours after promoter injection the promoter was probably being assimilated by the catalyst to a significant degree. This began to approximate prior art promoters which are incorporated into the catalyst in its manufacture or mixed with the catalyst outside of the regenerator. Our method of direct and independent promoter injection gives clearly superior results. Care must, of course, be taken to make remedial independent injections of promoter to compensate for the dampening effect which assimilation of the promoter by the catalyst may have upon the CO oxidation rate. That is to say, the unassimilated promoter must be periodically replenished.

The precise promoter solution that we used was composed of 61.4 grams of chloroplatinic acid, which acid contained 28.637 weight percent platinum as the elemental metal, diluted with distilled water to yield a volume of 2 liters. This solution was injected, over a period of a few seconds, into the dilute phase of the regenerator in the vicinity of the northeast cyclone. We believe that the uncertainty which might have been introduced into our data measurements by the shock of the one-shot injection of this test was avoided by waiting one hour before beginning to record our measurements. The amount of promoter we injected was roughly equivalent to 0.32 weight ppm. of platinum on the circulating catalyst inventory of the commercial unit.

We claim as our invention:

1. A method for regenerating a coke-contaminated catalyst with simultaneous carefully-controlled combustion of CO to $CO_2$ which comprises the steps of:

(a) introducing coke-contaminated catalyst containing from about 0.5 to 1.5 wt. % coke into a regeneration zone;

(b) adding to said regeneration zone, independently of said coke-contaminated catalyst, a CO oxidation promoter selected from the group consisting of compounds of noble metals in an amount on an average daily basis equivalent to form about 0.1 to about 15 wt ppm of the circulating catalyst inventory on an elemental basis to promote the combustion of CO to $CO_2$, dissolved in a liquid solvent selected from the group consisting of water and a hydrocarbon;

(c) passing oxygen-containing regeneration gas into said regeneration zone in an amount selected to burn said coke from said coke-contaminated catalyst and to provide sufficient excess oxygent to accomplish the desired amount of CO combustion to $CO_2$;

(d) reacting a first portion of said oxygen-containing regeneration gas with said coke-contaminated catalyst in said regeneration zone at oxidation conditions selected to remove coke from said coke-contaminated catalyst and to produce a flue gas containing CO and wherein said oxidation conditions are sufficient to cause combustion of CO to $CO_2$ in the presence of said oxidation promoter; and, (e) simultaneously contacting said flue gas and a second portion of said oxygen-containing regeneration gas with said CO oxidation promoter in said regeneration zone in the presence of regenerated catalyst containing less than 0.3 wt. % coke at said oxidation conditions, thereby making a controlled quantity of exothermic heat of reaction available for operation of said regeneration zone and (ii) decreasing the amount of CO in the flue gas by its combustion to $CO_2$.

2. A method as defined in claim 1 wherein the amount of CO oxidation promoter and oxygen-containing regeneration gas added to said regeneration zone are selected to produce flue gas containing CO in an amount equal to or less than a predetermined amount.

3. A method as defined in claim 1 wherein the amount of CO oxidation promoter and oxygen-containing regeneration gas added to said regeneration zone are selected to release an amount of exothermic heat of reaction sufficient to raise the average combustion temperature in said zone to a level effective to produce a regenerated catalyst containing residual carbon in an amount less than 0.3 wt. % coke.

4. A method as defined in claim 1 wherein the amount of CO oxidation promoter and oxygen-containing regeneration gas added to said regeneration zone are selected to release an amount of exothermic heat of reaction sufficient to raise the temperature of the regenerated catalyst to a predetermined level.

5. A method as defined in claim 1 wherein the amount of CO oxidation promoter added to said regeneration zone in step (b) is adjusted to a value sufficient to insure that substantially all of the heat released from the exothermic combustion of carbon monoxide occurs in the presence of regenerated catalyst thereby enabling control of the temperature of the flue gas below a predetermined level.

6. A method as defined in claim 1 wherein the amount of CO oxidation promoter added to said regeneration zone in step (b) is adjusted in conjunction with an amount of diluent gas passed to said zone to enable control of the temperature of the flue gas effluent below a predetermined level.

7. In a process for catalytically cracking a hydrocarbon feed stream wherein coke-contaminated cracking catalyst containing from about 0.5 to 1.5 wt. % coke and oxygen-containing regeneration gas are passed to a regeneration zone maintained at coke oxidizing conditions wherein coke is oxidized to produce a regenerated catalyst containing less than 0.3 wt. % coke and a flue gas containing carbon dioxide and carbon monoxide, a method of using the in situ combustion of CO to $CO_2$ to control the operation of said regeneration zone which comprises the steps of:

(a) passing to said regeneration zone, independently of said coke-contaminated catalyst, a CO oxidation promoter selected from the group consisting of compounds of noble metals in an amount on an average daily basis equivalent to from about 0.1 to about 15 wt ppm of the circulating catalyst inventory on an elemental basis to initiate and sustain carbon monoxide combustion in said zone to $CO_2$ in the presence of said regenerated catalyst dissolved in a liquid solvent selected from the group consisting of water and a hydrocarbon; and, (b) thereafter adjusting the amount of oxygen-containing regeneration gas being passed to said regeneration zone to a value stoichiometrically sufficient to burn said coke from said spent catalyst and to convert at least a portion of the CO to $CO_2$, thereby (i) making a controlled quantity of exothermic heat of reaction available for operation of said regeneration zone and (ii) decreasing the amount of CO in the flue gas by its combustion to $CO_2$.

8. A method as defined in claim 7 wherein the amount of CO oxidation promoter added to said regeneration zone is selected to produce flue gas containing CO in an amount equal to or less than a predetermined amount.

9. A method as defined in claim 7 wherein the amount of CO oxidation promoter added to said regeneration zone in step (a) is selected to release an amount of exothermic heat of reaction sufficient to raise the average combustion temperature in said zone to a level effective to produce a regenerated catalyst containing residual carbon in an amount less than 0.3 wt. % coke.

10. A method as defined in claim 7 wherein the amount of CO oxidation promoter added to said regeneration zone in step (a) is selected to release an amount of exothermic heat of reaction to raise the temperature of the regenerated catalyst to a predetermined level.

11. A method as defined in claim 7 wherein the amount of CO oxidation promoter added to the zone in step (a) is adjusted to a value sufficient to insure that substantially all of the heat released from the exothermic combustion of carbon monoxide occurs in the presence of regenerated catalyst thereby enabling control of the temperature of the flue gas below a predetermined level.

12. A method as defined in claim 7 wherein the amount of CO oxidation promoter added in step (a) is adjusted in conjunction with an amount of diluent gas passed to said zone to enable control of the temperature of the flue gas below a predetermined level.

13. In a process for catalytically cracking a hydrocarbon feed stream wherein coke-contaminated cracking catalyst containing from about 0.5 to 1.5 wt. % coke and oxygen-containing regeneration gas are passed to a regeneration zone maintained at oxidizing conditions and wherein said coke is oxidized to produce regenerated catalyst containing less than 0.3 wt. % coke and flue gas containing $CO_2$ and CO, a method of controlling the CO concentration in the flue gas within a predetermined CO concentration range which method comprises the steps of:

(a) passing to said regeneration zone, independently of said coke contaminated catalyst, a first amount of a liquid solution containing a solvent selected from the group consisting of water and a hydrocarbon with a noble metal compound CO oxidation promoter dissolved therein, wherein the combined amount of said first amount and the second amount of said solution added in step (e) is equivalent on an average daily basis of from about 0.1 to about 15 wt ppm of the circulating catalyst inventory on an elemental basis;

(b) passing to said regeneration zone oxygen-containing regeneration gas in an amount stoichiometrically sufficient to convert at least a portion of said CO to $CO_2$;

(c) converting in said regeneration zone, at conversion conditions including the presence of said CO oxidation promoter and regenerated catalyst, at least a portion of said CO to $CO_2$ to produce flue gas containing $CO_2$ and CO;

(d) analyzing said flue gas to determine a measured CO concentration and comparing said measured CO concentration with said predetermined CO concentration range; and, (e) passing to said regeneration zone a second amount of said CO oxidation promoter containing liquid solution to maintain said measured CO concentration within said predetermined CO concentration range.

14. A method as described in claim 13 wherein said CO oxidation noble metal promoter is selected from the group consisting of platinum, palladium and compounds thereof.

15. A method as described in claim 13 wherein said amounts of CO oxidation promoter passed to said regeneration zone in step (e) are equivalent on an average daily basis to from about 0.005 to about 10 wt. ppm. of the circulating catalyst inventory on an elemental metal basis.

16. A method as described in claim 13 wherein the amount of oxygen-containing regeneration gas is equivalent to about 10 to about 17 pounds of air per pound of coke entering said regeneration zone per unit time.

17. A method as described in claim 13 wherein said conversion conditions include a temperature of from about 1100° F. to about 1450° F. and a pressure of from about atmospheric to 50 psig.

18. In a process for catalytically cracking a hydrocarbon feed stream wherein coke-contaminated cracking catalyst containing from about 0.5 to 1.5 wt. % coke and oxygen-containing regeneration gas are passed to a regeneration zone maintained at oxidizing conditions and coke is therein oxidized to produce regenerated catalyst containing less than 0.3 wt. % coke and flue gas containing $CO_2$ and CO, a method of controlling a regeneration zone temperature within a predetermined temperature range which method comprises the steps of:

(a) passing to said regeneration zone, independently of said coke contaminated catalyst, a first amount of a liquid solution containing a solvent selected from the group consisting of water and a hydrocarbon with a noble metal compound CO oxidation promoter dissolved therein, wherein the combined amount of said first amount and the second amount of said solution added in step (e) is equivalent on an average daily basis of from about 0.1 to about 15 wt ppm of the circulating catalyst inventory on an elemental basis;
(b) passing to said regeneration zone an oxygen-containing regeneration gas in an amount stoichiometrically sufficient to convert at least a portion of said CO to $CO_2$;
(c) converting in said regeneration zone, at conversion conditions including the presence of said CO oxidation promoter and regenerated catalyst, at least a portion of said CO to $CO_2$ to produce flue gas containing $CO_2$ and CO;
(d) measuring a regeneration zone temperature to determine a measured regeneration zone temperature and comparing said measured temperature with said predetermined temperature range; and,
(e) passing to said regeneration zone a second amount of said liquid solution to maintain said measured regeneration zone temperature within said predetermined temperature range.

19. A method as defined in claim 18 wherein said amounts of promoter passed to said regeneration zone in step (e) are equivalent on an average daily basis to from about 0.005 to about 10 wt. ppm. of the circulating catalyst inventory on an elemental metal basis.

20. A method as defined in claim 19 wherein said regeneration zone temperature is a dilute phase temperature.

21. A method as described in claim 18 wherein the amount of oxygen-containing regeneration gas is equivalent to about 10 to about 17 pounds of air per pound of coke entering said regeneration zone per unit time.

22. A method as defined in claim 18 wherein said conversion conditions include a temperature of from about 1100° F. to about 1450° F. and a pressure of from about atmospheric pressure to 50 psig.

23. In a process for catalytically cracking a hydrocarbon feed stream wherein coke-contaminated cracking catalyst containing from about 0.5 to 1.5 wt. % coke and oxygen-containing regeneration gas are passed to a regeneration zone maintained at oxidizing conditions and coke is therein oxidized to produce regenerated catalyst containing less than 0.3 wt. % coke and flue gas containing $CO_2$ and CO, a method of controlling the concentration of residual carbon on regenerated catalyst within a predetermined residual carbon concentration range which method comprises the steps of:
(a) passing to said regeneration zone, independently of said coke contaminated catalyst, a first amount of a liquid solution containing a solvent selected from the group consisting of water and a hydrocarbon with a noble metal compound CO oxidation promoter dissolved therein, wherein the combined amount of said first amount and the second amount of said solution added in step (e) is equivalent on an average daily basis of from about 0.1 to about 15 wt ppm of the circulating catalyst inventory on an elemental basis;
(b) passing to said regeneration zone oxygen-containing regeneration gas in an amount stoichiometrically sufficient to convert at least a portion of said CO to $CO_2$;
(c) converting in said regeneration zone, at conversion conditions including the presence of said CO oxidation promoter and regenerated catalyst, at least a portion of said CO to $CO_2$ to produce flue gas containing $CO_2$ and CO;
(d) analyzing regenerating catalyst to determine a measured residual carbon concentration and comparing said measured residual carbon concentration with said predetermined residual carbon concentration range; and,
(e) passing to said regeneration zone a second amount of said liquid solution to maintain said measured residual carbon concentration within said predetermined residual carbon concentration range.

24. A method as described in claim 23 wherein said amounts of CO oxidation promoter passed to said regeneration zone in step (e) are equivalent on an average daily basis to from about 0.005 to about 10 wt. ppm. of the circulating catalyst inventory on an elemental metal basis.

25. A method as described in claim 23 wherein the amount of oxygen-containing regeneration gas is equivalent to about 10 to about 17 pounds of air per pound of coke entering said regeneration zone per unit time.

26. A method as described in claim 23 wherein said CO promoter noble metal is selected from the group consisting of platinum, palladium and compounds thereof.

27. A method as described in claim 23 wherein said conversion conditions include a temperature of from about 1100° F. to about 1450° F. and a pressure of from about atmospheric pressure to 50 psig.

28. A method for regenerating a coke-contaiminated catalyst containing from about 0.5 to 1.5 wt. % coke with simultaneous carefully-controlled combustion of CO in which method the CO-combustion rate is optimized by provision and replenishment of a CO-oxidation promoter in a state of less than total assimilation by said catalyst, which comprises the steps of:
(a) introducing said coke-contaminated catalyst into a regeneration zone;
(b) adding to said regeneration zone, independently of said coke-contaminated catalyst and in an amount selected to promote the combustion of CO to $CO_2$ and to provide unassimilated CO oxidation promoter to the regeneration zone, a liquid comprising water or a hydrocarbon containing a CO oxidation promoter selected from the group consisting of compounds of noble metal soluble in said liquid;
(c) passing oxygen-containing regeneration gas into said regeneration zone in an amount selected to burn coke from said coke-contaminated catalyst and to provide sufficient excess oxygen to accomplish the desired amount of CO combustion;
(d) reacting a first portion of the oxygen-containing regeneration gas with said coke contaminated catalyst in said regeneration zone at oxidation conditions which are selected to remove coke from said coke-contaminated catalyst and to produce a flue gas containing CO and which are sufficient to cause combustion of CO to $CO_2$ in the presence of said oxidation promoter;
(e) simultaneously contacting the flue gas and a second portion of the oxygen-containing regeneration gas with said CO oxidation promoter in the regeneration zone in the presence of regenerated catalyst at said oxidation conditions, thereby (i) making a controlled quantity of exothermic heat of reaction available for operation of said regeneration zone and (ii) decreasing the amount of CO in flue gas; and (f) replenishing unassimilated promoter within the regeneration zone by repetition of aforesaid step (b) as required to maintain a desired rate of CO-combustion.

29. A method as defined in claim 28 wherein the amounts of CO oxidation promoter added to said regeneration zone in steps (a) and (f) and said oxygen-containing regeneration gas are selected to release an amount of exothermic heat of reaction sufficient to raise the temperature of the regenerated catalyst to a predetermined level.

30. A method as defined in claim 28 wherein the amounts of CO oxidation promoter added to said regeneration zone in steps (a) and (f) and said oxygen-containing regeneration gas are adjusted to a value sufficient to insure that substantially all of the heat released from the exothermic combustion of carbon monoxide occurs in the presence of regenerated catalyst thereby enabling control of the temperature of the flue gas below a predetermined level.

31. A method as defined in claim 28 wherein the amounts of CO oxidation promoter added to said regeneration zone in steps (a) and (f) and said oxygen-containing regeneration gas are adjusted in conjunction with an amount of diluent gas passed to said zone to enable control of the temperature of the flue gas effluent below a predetermined level.

32. A method as defined in claim 28 wherein the amounts of CO oxidation promoter and oxygen-containing regeneration gas added to said regeneration zone are selected to produce flue gas containing CO in an amount equal to or less than a predetermined amount.

33. A method as defined in claim 24 wherein the amounts of CO oxidation promoter added to said regeneration zone in steps (a) and (f) and said oxygen-containing regeneration gas are selected to release an amount of exothermic heat of reaction sufficient to raise the average combustion temperature in said zone to a level effective to produce a regenerated catalyst containing residual carbon in an amount less than or equal to a predetermined value.

* * * * *